United States Patent [19]

Hazard et al.

[11] 3,710,459

[45] Jan. 16, 1973

[54] BIS(2-CARBOXY-1-THIACHROMON-YL AND -YLOXY)COMPOUNDS

[75] Inventors: Richard Hazard, Cropston; John King, Loughborough, both of England

[73] Assignee: Fisons Limited, Felixstowe, Suffolk, England

[22] Filed: Jan. 27, 1970

[21] Appl. No.: 6,311

[52] U.S. Cl. ....260/327 TH, 260/247.1, 260/293.57, 260/294.8 C, 260/516, 260/543 R, 260/544 R, 260/609 R, 424/248, 424/263, 424/267, 424/275
[51] Int. Cl. .................A61k 27/00, C07d 65/14
[58] Field of Search ................260/327 TH, 345.2

[56] References Cited

UNITED STATES PATENTS

| 3,506,654 | 4/1970 | Fried | 260/240 |
| 3,547,949 | 12/1970 | Malen et al. | 260/327 |

*Primary Examiner*—Henry R. Jiles
*Assistant Examiner*—Ceclia M. Jaisle
*Attorney*—Wenderoth, Lind & Ponack

[57] ABSTRACT

Novel bis (2-carboxy-1-thiachromon-yl and -yloxy) compounds indicated for use in the inhibition of the release of toxic products which arise from the combination of an antibody and an antigen.

12 Claims, No Drawings

BIS(2-CARBOXY-1-THIACHROMON-YL AND -YLOXY)COMPOUNDS

This invention relates to bis-chrome compounds, methods for their preparation and compositions containing them.

According to our invention we provide compounds of formula I,

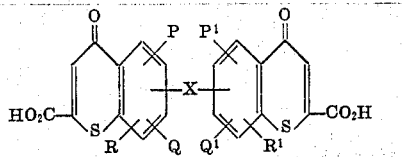

in which P, Q, R, $P^1$, $Q^1$ and $R^1$, which may be the same or different, each represent hydrogen; an alkyl, hydroxy alkyl or alkoxy alkyl group; an alkoxy, hydroxyalkoxy, alkoxyalkoxy or carboxyalkoxy group; an alkenyl or alkenyloxy group; an amino, mono- or di-alkyl amino, acylamino, aminoalkoxy or a dialkylamino alkoxy group; an acyl group; a hydroxy group or a halogen atom, X represents a linkage —O—$X^1$—O— or a linkage —$X^1$— in which $X^1$ represents a saturated or unsaturated straight or branched hydrocarbon chain, optionally substituted by one or more halogen atoms, carbonyl oxygen atoms, or hydroxy or alkoxy groups and optionally interrupted by carbocyclic or heterocyclic ring, or an oxygen atom, and pharmaceutically acceptable derivatives thereof.

According to our invention we also provide a process for the production of a compound of formula I, which comprises, either, a. reacting a compound of formula II,

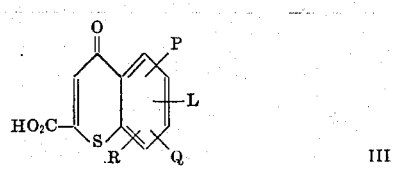

in which P, Q, R, $P^1$, $Q^1$ and $R^1$ are as defined above, and the pair of groups $A^1$, $A^2$ either represent a chain —CO—CH=C(COOH)—S— or a derivative thereof or form the pair of groups $A^3$, $A^4$ which represent a chain or pair of groups (one of which may be hydrogen) convertible to a —CO—CH=C(COOH)—S— chain or a derivative thereof, at least one of the pairs of groups $A^1$, $A^2$ being a pair of groups $A^3$, $A^4$, so as to convert any pair(s) of groups $A^3$, $A^4$ to a chain —CO—CH=C(COOH)—S— or a derivative thereof, or b. reacting a compound of formula III,

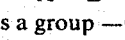

in which P, Q and R are as defined above, and L represents a group capable of reacting with a group $L^1$ in a compound of formula IV,

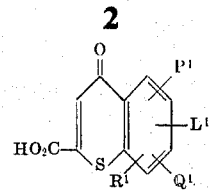

in which $P^1$, $Q^1$ and $R^1$ are as defined above, with a compound of formula IV to form the desired —X— linkage, and where desired converting the resulting compound of formula I to a pharmaceutically acceptable derivative thereof.

Process (a) may be carried out in a number of ways. Thus the desired thiapyrone ring(s) may be formed by cyclising a compound of formula II, in which the pair(s) of groups $A^3$, $A^4$ are represented by formula V,

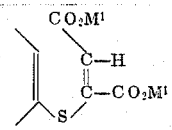

in which $M^1$ represents hydrogen or an alkali metal atom.

The cyclisation of the group of formula V may be carried out by treating the corresponding compound of formula II with a cyclisation agent at ambient temperature or above. Suitable cyclising agents include dehydrating agents, concentrated acids, e.g. polyphosphoric acid, sulphuric acid, chlorosulphonic acid and other Lewis acids. When a dehydrating agent is used the reaction is preferably carried out under anhydrous conditions and it is preferred to subject the compound of formula II to a drying step before use.

Alternatively the process may be effected by converting the —$COOM^1$ groups of formula V to acyl chloride groups, e.g., by treatment with $PCl_3$, $PCl_5$ or $SOCl_2$, and subjecting the resulting acyl chloride to an internal Friedel Crafts reaction.

Process (b) may be carried out in a number of ways. Thus the formation of the X linkage may take place in one, two or several stages. The use of a multistage linkage process is of especial application where the linkage group X has substituents or is interrupted by a carbocyclic or heterocyclic ring or an oxygen atom. Such substituents and interrupting groups may be introduced during the progressive build up of the linkage.

The formation of the desired X linkage in process (b) may take place according to the following alternatives, i. L or $L^1$ may be a group of formula VII, $$—X^2—L^2 \qquad \text{VII}$$

in which $X^2$ represents a group —O—$X^1$ or a precursor therefor, or a group —$X^1$ or a precursor therefor, $X^1$ is as defined above, and $L^2$ is a group capable of reacting with whichever of L or $L^1$ does not represent a group of formula VII, ii. both L and $L^1$ are groups capable of reacting with a compound of formula VIII, $$L^3—X^3—L^4 \qquad \text{VIII}$$

in which $L^3$ and $L^4$ are groups capable of reacting with L and $L^1$ to form the desired linkage, and $X^3$ represents a group X or a precursor therefor, iii. either L or $L^1$ may be a group of formula IX, $$-X^2-L^5 \qquad \text{IX}$$

in which $X^2$ is as defined above, and $L^5$ is a group capable of being reacted further to give a group of formula VII.

The formation of the ether linkages in the $-O-X^1-O-$ group may be brought about by reacting an OH group with an anion forming or other group which reacts with an OH group to form an ether linkage. Suitable groups for reacting with the OH group include halogen, e.g. bromine or iodine, methane sulphonate or tosylate groups and groups which form a precursor to the $X^1$ function, e.g. epoxide groups or terminal ethylenic double bends.

The ether linkage forming reaction may be carried out in the presence of alkali in water or in an organic solvent e.g. acetone or dioxan, at elevated temperatures. Where the reactive group is an anion forming group, the reaction may be carried out in the presence of an acid-binding agent, e.g. a carbonate, bicarbonate or alkoxide of sodium or potassium, or pyridine, diethylaniline or triethylamine. Where the reactive group is an epoxide group, the reaction may be carried out in an organic solvent, e.g. dioxan, at an elevated temperature and in the presence of a catalyst, e.g. a quatanary ammonium hydroxide. Where the reactive group is a halogen, the reaction may be carried out in a solvent, e.g. acetone, in the presence of freshly prepared silver oxide, or in the presence of an organic base or an acid binding agent.

The building of X groups, which carry substituents or in which the chain is interrupted may be carried out by techniques conventional in organic chemistry.

The formation of a linkage in which X is $-X^1-$ may be carried out by techniques conventional for the formation of carbon to carbon bonds, e.g. by means of a Friedel Crafts reaction using an alkyl halide or an acyl halide.

The processes (a) and (b) described above for the formation of the pyrone ring(s) and for the formation of the $-X-$ linkage may also be applied in analogous manner to the production of pyrone ring(s) and $-X-$ linkages in the production of the starting materials, i.e. the compounds of formula II, III and IV. It may be desirable during the build up of the two chromone ring systems to shield or block a site at which a later ring is to be introduced. This shielding or blocking may be achieved by conventional methods.

It will be appreciated that in the above reactions precursors of the reagents, i.e. compounds which react under the conditions of the reaction in the same manner as the reagents, may be used. Thus for example, an acetoxy derivative of a phenollic hydroxy group may be used in place of the free hydroxy group.

Compounds of formula II containing a group of formula V may be made by chlorosulphonation (or by sulphonation followed by conversion of the sulphonic acid group to a sulphonyl chloride group, e.g. by reaction with $POCl_3$) of the benzene nucleus to yield an appropriate compound containing a group of formula X,

X and then reducing this group to give a thiophenol group of formula XI,

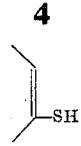
XI

This thiophenol may then be reacted with acetylene dicarboxylic acid, or a salt or an ester thereof, to yield the desired compound of formula II containing a group of formula V.

The chlorosulphonation may be carried out using conventional techniques, for example using chlorosulphonic acid in an inert solvent, e.g. chloroform at below about 0°C. The reduction of the chlorosulphonate to a thiophenol may be carried out, for example using stannous chloride under acidic conditions, which may be provided by hydrogen chloride and glacial acetic acid. The reaction of the thiophenol with acetylene dicarboxylic acid or an ester, preferably a C1-4 alkyl ester, or salt thereof may be carried out under alkaline conditions. The reaction is preferably carried out under anhydrous conditions and may be carried out in a suitable solvent or diluent. The reaction may be carried out at from 50° to 150°C. It is believed that the alkali, which may be an organic base or an alkali-metal hydroxide, acts catalytically and we prefer to use from 5 to 20, and more preferably about 10, molar percent of alkali based on the compound containing a group of formula XI.

In the above reaction the acetylene dicarboxylate ester may be replaced by an ester of a mono-halofumaric acid, or a precursor thereof. In this case the reaction is a condensation and involves the elimination of halogen acid or alkali metal halide between the halofumarate and the compound containing the group of formula XI. The reaction is therefore preferably carried out in the presence of an acid binding agent when $M^1$ represents H, through other methods of eliminating the halogen acid may be used if desired. It is also possible to use a precursor of the halofumarate ester, e.g. a halomaleate or a dihalosuccinate ester. When precursors are used it may be necessary to provide extra alkali to ensure conversion of the precursor to the desired halofumarate ester. The products of the above reactions usually contain the group of formula V in the form of an ester. The free group of formula V may be readily obtained for these esters by conventional alkaline hydrolysis.

The compounds of formula I and the intermediates therefor may be recovered and purified using techniques conventional in the recovery and purification of similar known compounds.

The processes outlined above may produce the free acids of formula I or may yield derivatives thereof. It is also within the scope of the present invention to treat the product of any of the above processes, after any isolation and purification steps that may be desired, in order to liberate the free acid therefrom or to convert one form of derivative into another. The methods used to isolate and purify any product may be those conventionally used. Thus, salts may be prepared by the use of alkaline conditions during the recovery and purification of the compound. Alternatively, the free acid may be obtained and subsequently converted to a desired salt by neutralization with an appropriate base, e.g., an organic amine, or an alkali such as an alkali-metal or alkaline-earth metal hydroxide, carbonate or bicarbonate, preferably a mild base or alkali such as sodium carbonate or bicarbonate. Where the compound is recovered in the form of a salt, this salt may be converted to a more desirable salt, for example by a meathetical process. The esters may be formed by the reaction of an appropriate alcohol, alkyl sulphate or halo-compound with free carboxyl groups in the compound I; or may be formed by the reaction of an appropriate alcohol with an acyl halide of the compound of formula I. Alternatively, transesterification techniques may be used to exchange one ester group for another. The amides may be readily obtained, for example, by dehydration of the ammonium salt or by reaction of an ester or acyl halide with an appropriate amino compound such as ammonium hydroxide or a primary or secondary amine or an amino acid. Alternatively, the free acid of formula I may be condensed with an alkyl haloformate (e.g. chloroformate) in the presence of an organic base such as triethylamine, to yield a mixed anhydride which is then treated with an amino-acid or ester thereof in the presence of a suitable solvent to give an N-carboxyalkyl substituted amide. The mixed anhydride need not be isolated from the reaction mixture in which it was prepared, but may be treated in situ.

Pharmaceutically acceptable derivatives of the compounds of formula I include pharmaceutically acceptable salts (notably water soluble salts), esters and amides of one or more of the 2-carboxylic acid groups. Suitable salts include ammonium salts, alkali metal salts (e.g., sodium, potassium and lithium salts), alkaline earth metal salts (e.g., magnesium and calcium salts) and salts with organic bases, e.g., amine salts derived from mono-, di- or tri-lower alkyl or lower alkanolamines. (such as triethanolamine or triethylamine) and salts with heterocyclic amines such as piperidine or pyridine.

Esters which may be mentioned include simple alkyl esters derived from alcohols containing from one to 10 carbon atoms (e.g. a methyl, ethyl, propyl, or pentyl ester) and alkylaminoalkyl esters, such as those of the general formula —COO—R''—NR'''R'''' wherein R'' is a branched or straight alkylene chain (e.g., one containing from one to four carbon atoms such as a methylene, ethylene, propylene, isopropylene or tert. butylene group); and R''' and R'''' may be the same or different and each is selected from hydrogen or an alkyl group (e.g., a lower alkyl group such as a methyl, ethyl, propyl or butyl group) or together with the nitrogen atom form an heterocyclic ring such as a piperidine or morpholine ring. Examples of such basic esters are diethylaminoethyl and piperidinoethyl esters. The basic esters may be in the form of an physiologically acceptable acid addition salt thereof e.g. the hydrochloric acid salt.

Amides which may be mentioned include simple amides derived from ammonia or primary or secondary aliphatic or aromatic amines, such as mono- or di-lower alkyl amines (for example diethylamine), aniline or a mono-alkylaniline such as methyl aniline; and more complex amides derived from amino acids such as glycine, i.e. amides of the formula —CONR'—R''—COOH, or salts and esters thereof, and from mono- or bis-(dialkylamino-alkyl) amines, i.e. amides of the formula —CONR'—R''—NR'''R'''' wherein R' is hydrogen or an alkyl group (e.g. a lower alkyl group such as a methyl, ethyl, propyl or butyl group) and R'', R''' and R'''' have the values given above. The amides may exist in the form of physiologically acceptable acid salt thereof, e.g. an hydrochloride.

Preferred pharmaceutically acceptable derivatives of the compounds of formula I are the sodium and ammonium salts, the alkyl, dialkylamino-alkyl and piperidinoalkyl esters where the alkyl groups contain from one to six carbon atoms, e.g., ethyl groups, and amides derived from ammonia, aminoacids, e.g., glycine, and dialkylaminoalkyl amines, e.g., diethylaminoethyl amine.

The new compounds of formula I and pharmaceutically acceptable derivatives thereof are useful because they have pharmacological properties. In particular they have been shown to inhibit the release of toxic products which arise from the combination of certain types of antibody and specific antigen, e.g., the combination of reaginic antibody with specific antigen. In man, both subjective and objective changes which result from the inhalation of specific antigen by sensitized subjects may be markedly inhibited by administration of the new compounds. Thus, the new compounds are indicated for use in the treatment of 'extrinsic' allergic asthma. The new compounds may also be of value in the treatment of so-called 'intrinsic' asthma (in which no sensitivity to extrinsic antigen can be demonstrated) and in the treatment of other conditions in which antigen-antibody reactions are responsible for disease, for example, hay fever, urticaria and auto-immune diseases.

According to a further feature of the invention there is provided a pharmaceutical composition comprising a compound of formula I, or a pharmaceutically acceptable derivative thereof, preferably in the form of a salt, in association with a pharmaceutically acceptable carrier or diluent. There is also provided a process for the manufacture of such a pharmaceutical composition which comprises mixing a compound of formula I with a pharmaceutically acceptable carrier or diluent. For the sake of simplicity the pharmaceutical compositions will be described with respect to the compounds of formula I only, but pharmaceutically acceptable derivatives thereof are to be understood to be included.

The nature of the composition and the pharmaceutically acceptable carrier or diluent will, of course, depend upon the desired mode of administration, which may be for example, orally; by inhalation; parenterally; or by topical application.

The composition may be formulated in the conventional manner with the customary ingredients. For example, the compositions may be put up as aqueous solutions or suspensions, as powders or in tablet, cream, lotion or syrup form.

The compositions of the invention generally comprise a minor proportion of the compound of formula I and a major proportion of carrier or diluent. Thus, for example, aqueous solutions for administration by means of a conventional nebulizer may contain up to about 10 percent by weight of the active ingredient in sterile water; and compositions for dispensing from a pressurized container comprising suspensions or solutions in liquefied propellants will contain, for example, about 0.2–5 percent by weight of the active ingredient.

The compounds of formula I are preferably administered by inhalation notably in the treatment of allergic asthma. For such use, the compounds of formula I, preferably in the form of a salt, e.g., the sodium salt, are dissolved or suspended in water and may be applied by means of a conventional nebulizer. However the administration of the compounds of formula I by means of a pressurized dispensing container, i.e., an aerosol dispenser, is an alternative to nebulizer administration. For administration from an aerosol dispenser, the medicament is dissolved or suspended in a liquefied propellant medium. The propellants for present use may be any of those which are conventionally used in formulations for dispensing from pressurized container. For example they may be of the halogenated hydrocarbon type, e.g., fluoro- or fluorohalo- hydrocarbons. Typical suitable propellants are those disclosed in U.S. Pat. No. 2,868,691 and sold under the trade name of Freon. The propellant should of course be of low toxicity, especially where the composition is to be ingested, e.g. inhaled, by the user. It is therefore preferred to use difluorodichloromethane, dichlorotetrafluoroethane or mixtures thereof. Where the compound of formula I is not soluble in the propellant, it may be necessary to add a surface-active agent to the composition in order to suspend the compound of formula I in the propellant medium, and such surface-active agents may be any of those commonly used for a similar purpose. The use of surface-active agents are more fully described in British Patent specification No. 1,063,512.

The compositions of the invention may also be administered in the form of powders by means of an insufflator device, e.g. that described in British Patent Specification No. 1,122,284. In order to improve the properties of the powder, it may be desired to modify the surface characteristics of the powder particles, for example, by coating them with a pharmaceutically acceptable material such as sodium stearate. In addition, fine particle sized powders of the active ingredients may be mixed with a coarser diluent material, such as lactose, which may be present in a smaller, equal, or greater amount than the active ingredients, for example in from 50 to 150 percent by weight of the compound of formula I and such other active ingredients as may be present.

Whilst the inhalation of medicament has been described above with particular reference to oral administration, it will be appreciated that it may be desirable to administer the medicament nasally. The term inhalation is therefore used herein to denote, where the context permits, both oral and nasal administration.

The composition of the invention may also be administered as tablets, syrups and the like or by intradermal or intravenous injection in the conventional manner.

The compounds of formula I may also find use in the treatment of eye conditions, for example that associated with hayfever. For such use the compound of formula I may be used in the form of an eye drop as an aqueous solution containing about 2 percent of the compound and a preservative.

In addition to the internal administration, the compounds of formula I find use in compositions for topical application, e.g. as creams, lotions or pastes for use in dermatological treatments.

In addition to the compound of formula I and the ingredients required to present the compound in a form suitable for the selected mode of administration, other active ingredients may be present in the composition of the invention. Thus, in compositions for administration by inhalation, it may be beneficial to include a brochodilator. Any bronchodilator may, within reason, be used. Suitable bronchodilators include isoprenaline, adrenaline, orciprenaline, isoetharine and derivatives thereof, particularly the salts thereof. The use of isoprenaline sulphate is preferred. The amount of bronchodilator used will vary over a broad range, depending, inter alia, upon the nature and activity of the bronchodilator and the compound of formula I used. However, the use of a minor proportion (i.e. less than 50 percent by weight) of the bronchodilator is preferred. The use of from 0.1 to 10 percent by weight of the bronchodilator based on the weight of the compound of formula I is particularly preferred. As indicated above, the compounds of formula I are indicated for use in inhibiting the effects of antibody-antigen reactions. In such treatment, the compound or composition of the invention is administered by the chosen method to the site of the antibody-antigen reaction in the therapeutically effective amount. The treatment may be one which requires repeated dosages of the medicament at regular intervals. The amount and frequency of medicament administered will depend upon many factors and no concise dosage rate or regimen can be generally stated. However, as a general guide, where the compounds are administered by inhalation to a patient suffering from acute allergic asthma, therapeutically useful results may be achieved when the compounds are administered at a dosage of 0.1 to 50 mgs. Where the compounds are administered by the oral route, larger dosages may be given.

It will be appreciated that certain of the above values of P, Q, R, $P^1$, $Q^1$, $R^1$ and X may include groups which could be detrimentally affected by the reactants or reaction conditions used in the production of the compounds of formula I. In such cases the susceptible group may be blocked or shielded by conventional techniques during all or part of the production of the compounds of formula I.

Particularly preferred compounds of formula I are those wherein P, Q, R, $P^1$, $Q^1$ and $R^1$ are each substituents containing less than 7 carbon atoms and $X^1$ represents a polymethylene chain optionally substituted by one or more halogen atoms, carbonyl oxygen atoms, alkoxy groups, or preferably OH groups, or which is interrupted by one or more oxygen atoms. It is also preferred that P, Q, R, $P^1$, $Q^1$ and $R^1$ be selected from hydrogen, hydroxy, halogen, loweralkyl or lower alkoxy, or lower alkyl- or lower alkoxy substituted by a hydroxy, lower alkoxy or di-lower-alkylamino group. Furthermore it is preferred that the chromone groups should be the same and be linked through the same positions on the chromone nuclei, e.g. between the 6 and $6^1$, or the 7 and $7^1$ positions. Particularly preferred values of $X^1$ is a polymethylene chain of up to and including six carbon atoms, optionally substituted by a single hydroxy group.

Specific examples of substituents P, Q, R, $P^1$, $Q^1$ and $R^1$ in formula I are chloro, bromo, iodo, hydroxy, acetoxy, methyl, ethyl, propyl, butyl, allyl, 1-methyl-allyl, prop-1-enyl, methoxy, ethoxy, propoxy, butoxy, allyloxy, but-3-enoxy, acetyl, hydroxymethyl, ethoxymethyl, 2-hydroxypropoxy, 3-hydroxypropoxy, 2,3-dihydroxypropoxy, 2-hydroxybutoxy, 3-methylbutoxy, 2-ethoxyethoxy, 3-methoxy-2-hydroxypropoxy, 3-butoxy-2-hydroxypropoxy, diethylaminoethoxy, and acetylamino groups.

The invention is illustrated, but in no way limited by the following examples.

EXAMPLE 1

1,5-Bis(2-carboxy-1-thiachromon-6-yloxy) pentane [Process (a)]

a. 1,5-Diphenoxypentane - 4', 4'' - bis sulphonylchloride

A solution of 10 parts of 1,5-diphenoxypentane in 60 parts of chloroform was stirred at 8°C and 25 parts of chlorosulphonic acid were run in dropwise over 30 minutes, keeping the temperature, below 0°C. The mixture was then allowed to reach room temperature, stirred for 1 hour and poured into ice-water. The product was extracted with chloroform, and the chloroform extracts were washed with ice-cold water and dried over sodium sulphate. After filtration, the solvent was removed and 7.5 parts of a greyish white crystalline mass m.pt. 119°–121°C, remained. On crystallization from a benzene-petroleum mixture, 5.5 parts of pure 1,5-diphenoxypentane - 4', 4'' - bis-sulphonyl chloride, m.pt. 125°–126°C was obtained.

A small portion was converted into 1,5-diphenoxypentane - 4', 4'' - bis-sulphonamide, m.p. 172°–173.5°.

Analysis:
Found: S, 15.7
$C_{17}H_{22}N_2O_6S_2$ requires: S, 15.45 percent b. 1,5-Diphenoxypentane - 4', 4''- dithiol Dry hydrogen chloride was passed into a stirred suspension of 90 parts of stannous chloride in 340 parts of glacial acetic acid, until the mixture became homogeneous. The 1,5-diphenoxy pentane 4', 4'' bis-sulphonyl chloride was finely ground and 15.3 parts were added and the mixture was stirred for 1½ hours at room temperature. It was then poured into a solution of 400 parts of concentrated hydrochloric acid in 3,000 parts of water. The precipitated solid was filtered off and this solid was extracted with chloroform. The filtered chloroform extract was shaken with 2 percent sodium hydroxide solution and the aqueous layer was separated, acidified to pH 3 with dilute hydrochloric acid and the mixture again extracted with chloroform. This final chloroform extract was separated, dried over sodium sulphate filtered and evaporated to give 3.03 parts of 1,5-diphenoxy-pentane - 4', 4''- dithiol m.pt. 59°–61C, which solidified on cooling.

Analysis:
Found: C, 63.3 percent H, 6.33 percent
$C_{17}H_{20}O_2S_2$ requires: C, 63.7 percent H, 6.29 percent c. 1,5-Bis [4-(1,2-transdicarboxyvinylthia) phenoxy] pentane An aqueous solution of potassium hydroxide was prepared by dissolving 4.61 parts of potassium hydroxide pellets in 10 parts of water. To this was added 4 parts of 1,5-diphenoxypentane - 4', 4''- dithiol and 4.16 parts of acetylene dicarboxylic acid monopotassium salt. The mixture was shaken to dissolve and heated on the steam bath for 45 minutes. After cooling and filtering, the filtrate was acidified with concentrated hydrochloric acid and the precipitated solid was filtered off, washed with water, and dried. The yellow solid (4.1 parts, m.pt. 198°–200°C) was crystallized from aqueous ethanol to give 1,5-bis[4-(1,2-transdicarboxyvinylthia) phenoxy] pentane, m.pt. 205°–207°C.

Analysis:
Found: C, 54.4 H, 4.83 S, 12.2 percent
$C_{25}H_{24}O_{10}S_2$ requires: C, 54.7 H, 4.41 S, 11.7 percent d. 1,5-Bis(2-carboxy-1-thiachromon-6-yloxy)pentane To 36 parts of concentrated sulphuric acid was added 1 part of 1,5-bis [4-(1,2-transdicarboxyvinylthia) phenoxy] pentane. The solution was held at approximately 5°C for 15 hours, poured into 200 parts of ice and water and the precipitated solid was filtered off and washed with water several times by centrifuging to remove sulphuric acid. The residue was filtered off, pressed dry and crystallized from glacial acetic acid to give 1,5-bis(2-carboxy-1-thiachromon-6-yloxy) pentane, m.pt. 216°–217°C which, after drying for 1½ hours at 110° under vacuum, analyzed for $C_{25}H_{24}O_8S_2$ ½ $CH_3CO_2H$.

Analysis:
Found: C, 57.4 H, 4.2 S, 11.8 percent
$C_{25}H_{24}O_8S_2$ ½ $Ch_3CO_2H$ requires: C, 57.6 H, 4.06, S, 11.8 percent e. Disodium salt of 1,5-bis(2-carboxy-1-thiachromon-6-yloxy) pentane A portion of the above prepared 1,5-bis(2-carboxy-1-thiachromon-6-yloxy) pentane was dried overnight at 140° under vacuum to remove all the acetic acid of crystallization. It was then dissolved in water containing the equivalent amount of sodium hydrogen carbonate and the resulting solution was freeze dried to give the disodium salt of 1,5-bis(2-carboxy-1-thiachromon-6-yloxy) pentane.

EXAMPLE 2

1,5-bis(2-carboxy-1-thiachromon-6-yl)pentane a. 1,5-Diphenylpentane - 4', 4''- disulphonylchloride A solution of 10 parts of 1,5-diphenyl-pentane in 60 parts of chloroform was stirred at −5°C and 25 parts of chlorosulphonic acid were run in dropwise over 30 minutes, keeping the temperature below 0°C. The mixture was then allowed to reach room temperature, stirred for 1 hour and poured into ice-water. The product was extracted with chloroform and the chloroform extracts were washed with cold water and dried over sodium sulphate. After filtration the solvent was removed and 9 parts of 1,5-diphenylpentane-4',4''-disulphonyl chloride as a highly viscous yellow oil was obtained.

A small portion was converted into 1,5-diphenylpentane-4', 4''-disulphonamide m.p. 127°–28°C for characterization.

Analysis: Found: C, 53.5; H, 5.5; N, 7.40; S, 16.75
$C_{17}H_{22}O_4S_2N_2$ requires: C, 53.3; H, 5.8; N, 7.34; S, 16.75 b. 1,5-Diphenoxypentane - 4', 4'' - dithiol

Dry hydrogen chloride was passed into a stirred suspension of 127 parts of stannous chloride in 450 parts of glacial acetic acid, until the mixture became homogeneous. 20 parts of 1,5-diphenylpentane - 4', 4'' -disulphonylchloride were added and the mixture was stirred for 1½ hours at room temperature. It was then poured into 450 parts of concentrated hydrochloric acid and the mixture was diluted with 1,000 parts of ice-water. The product was extracted with chloroform and the chloroform extracts were washed with water and dried over sodium sulphate. After filtration the solvent was removed and 11 parts of 1,5-diphenylpentane-4',4'''-dithiol were obtained as a yellow oil.

c. 1,5-Bis[4-(1,2-transdicarboxyvinylthia)phenyl] pentane

An aqueous solution of potassium hydroxide was prepared by dissolving 5.9 parts of potassium hydroxide pellets in 25 parts of water. This was added dropwise to a suspension of 11 parts 1,5-diphenylpentane-4',4'''-dithiol, 10.9 parts of acetylenedicarboxylic acid mono-potassium salt and 10 parts of water. The mixture was stirred and heated on a steam bath for 45 minutes. The solution was then filtered while still hot and acidified with diluted hydrochloric acid and the precipitated solid comprising 1,5-bis[4-(1,2-transdicarboxyvinylthia)phenyl] pentane was filtered off, washed with water and dried, m.p. 101° (decomp.).

Analysis: Found: S, 12.70
$C_{25}H_{24}S_2O_8$ requires: S, 12.40 percent d. 1,5-Bis(2-carboxy-1-thiachromon-6-yl)pentane To 20 parts of concentrated sulphuric acid were added 3 parts of 1,5-bis[4,-1,2-transdicarboxyvinylthia)phenyl] pentane. The solution was held at room temperature for 6 hours, poured into 500 parts of ice and water and the precipitated solid was filtered off. The solid was washed acid free with cold water and dried. It was then dissolved in sodium bicarbonate solution and acidified with dilute hydrochloric acid. The precipitated solid was filtered off, washed with water and dried to give 0.4 parts of 1,5-bis(2-carboxy-1-thiachromon-6-yl)pentane, m.p. 119°–21°C.

Analysis: Found: S, 13.0;
$C_{25}H_{20}O_6S_2$ requires: S, 13.3 percent e. Disodium salt of 1,5-bis(2-carboxy-1-thiachromon-6-yl)pentane.

0.2 parts of 1,5-bis(2-carboxy-1-thia-chromon-6-yl)pentane were dissolved in a solution of 20 parts of water and 0.07 parts sodium hydrogen carbonate and the resulting solution was freeze-dried to give the disodium salt of 1,5-bis(2-carboxy-1-thiachromon-6-yl)pentane.

EXAMPLE 3

1,3-Bis(2-carboxy-1-thiachromon-6-yloxy)propan-2-ol.

a. 1,3-Diphenoxypropan-2-ol-4', 4''- disulphonylchloride

A solution of 10 parts of 1,3-diphenoxypropan-2-ol in 30 parts of chloroform was stirred at −5°C and 30 parts of chlorosulphonic acid in 50 parts of chloroform were run in dropwise over 30 minutes keeping the temperature below 0°C. The mixture was then allowed to reach room temperature, stirred for 1 hour and poured into ice water. The product was extracted with ether and the ether extracts were washed with ice water and dried over sodium sulphate. After filtration the solvent was removed and the residue was crystallized from a mixture of benzene and petroleum ether. 1.4 parts of 1,3-diphenoxypropan-2-ol-4', 4''-disulphonylchloride, m.p. 147°–149°C were obtained.

Analysis: Found: C, 41.0; H, 3.14; Cl, 16.2; S, 14.7;
$C_{15}H_{14}Cl_2S_2O_7$ requires: C, 40.8; H, 3.20; Cl, 16.1; S, 14.5 percent b. 1,3-Diphenoxypropan-2-ol-4',4''-dithiol Dry hydrogen chloride was passed into a stirred suspension of 105 parts of stannous chloride in 450 parts of glacial acetic acid until the mixture was homogeneous. 17.5 parts of 1,3-diphenoxypropan-2-ol-4',4''-disulphonyl chloride were added and the mixture was stirred for 2 hours. The reaction mixture was poured into 540 parts of concentrated hydrochloric acid and 3,000 parts of water were added.

The precipitated solid was filtered off and dissolved in chloroform. The chloroform solution was filtered and extracted with 2N sodium hydroxide solution. The aqueous layer was separated and acidified with dilute hydrochloric acid. The precipitated yellow solid was filtered off, redissolved in chloroform, dried, filtered and the solvent was evaporated leaving a yellow oil which rapidly crystallized to give 1,3-diphenoxypropan-2-ol-4',4''-dithiol, m.p, 89°–91°.

c. 1,3-Bis 4-(1,2-transdicarboxyvinylthia)phenoxy propan-2-ol

An aqueous solution of potassium hydroxide was prepared by dissolving 7.5 parts of potassium hydroxide pellets in 15 parts of water. This was added to 14.5 parts of 1,3-diphenoxypropan-2-ol-4',4''-dithiol. A slurry of 7.7 parts of acetylene dicarboxylic acid monopotassium salt in 50 parts of water was added and the mixture was stirred and heated on a steam bath for 45 minutes. The solution was then filtered while still hot and acidified with diluted hydrochloric acid after cooling. The yellow precipitate of 1,3-bis[4-(1,2-transdicarboxyvinylthia)phenoxy]propan-2-ol was filtered off, washed with water and dried, m.p. 206°–207°C.

Analysis: Found: C, 51.0; H, 3.72;
$C_{23}H_{20}O_{11}S_2$ requires: C, 51.5; H, 3.76 percent d. 1,3-Bis(2-carboxy-1-thiachromon-6-yloxy) propan-2-ol 1 Part of 1,3-bis[4-(1,2-transdicarboxyvinylthia)phenoxy] propan-2-ol was added to 5 parts of concentrated sulphuric acid. The mixture was well stirred and then kept at room temperature for 3 hours. It was poured into 100 parts of ice, filtered off, and crystallized from glacial acetic acid and dried in vacuo, m.p. 215°–17°C to give 1,3-bis(2-carboxy-1-thiachromon-6-yloxy)propan-2-ol.

Analysis for monohydrate:
Found: C, 53.6; H, 3.6; S, 12.7;
$C_{23}H_{16}O_9S_2 H_2O$ requires: C, 53.2; H, 3.5; S, 12.4 percent e. disodium salt of 1,3-bis(2-carboxy-1-thiachromon-6-yloxy)propan-2-ol.

9 Parts of 1,3-bis(2-carboxy-1-thiachromon-6-yloxy)propan-2-ol were dissolved in a solution of 100 parts of water and 3.5 parts of sodium hydrogencarbonate solution and the resulting solution was freeze dried to give the disodium salt of 1,3-bis(2-carboxy-1-thiachromon-6-yloxy)propan-2-ol.

EXAMPLE 4

1,6-Bis(2-carboxy-8-methoxy-1-thiachromon-5-yl)hexane [Process (a)]

a. 1,6-Bis(4-methoxyphenyl)hexane-3'3''-disulphonyl chloride

A solution of 15 parts of 1,6-bis(4-methoxyphenyl)hexane in 150 parts of chloroform was stirred at −10°C and 17.4 parts of chlorosulphonic acid were run in dropwise within 20 minutes. It was then stirred for 1 hour and allowed to reach room temperature. Then it was poured into 300 parts of ice. The chloroform layer was separated and to the aqueous phase was added 15 parts of sodium chloride. The white precipitate was filtered off, dried at 80°C overnight and treated with 30 parts of phosphorous oxychloride on a steam bath for 14 hours. The reaction mixture was cooled, poured into 500 parts ice and extracted with chloroform. The chloroform was washed, dried and evaporated, leaving 18 parts of a brown solid. Crystallization from a mixture of petrol and benzene gave 15 parts of 1,6-bis(4-methoxyphenyl)hexane-3'3''-disulphonyl chloride as a white solid.

Analysis: Found: C, 47.83; H, 4.74; S, 13.2; Cl, 14.6
$C_{20}H_{24}O_6Cl_2S_2$ requires: C, 48.5; H, 4.85; S, 12.9; Cl, 14.4 b. 1,6-Bis(4-methoxyphenyl)hexane-3'3''-dithiol

Dry hydrogen chloride was passed into a stirred suspension of 56.2 parts of stannous chloride and 250 parts glacial acetic acid until the mixture became homogeneous. 11 Parts of 1,6-bis(4-methoxyphenyl)hexane-3'3''-disulphonyl chloride were added and the mixture was stirred for 1 hour at room temperature. The brown solution was then poured into 250 parts concentrated hydrochloric acid, diluted with 500 parts of ice and water and the precipitated solid was filtered off. The mother liquor was extracted with chloroform. The solid was dissolved in chloroform and the combined chloroform solutions were washed and dried over sodium sulphate. Evaporation of the solvent gave 7 parts of a yellow solid which was crushed in petroleum, filtered and dried in a low oven to give 1,6-bis(4-methoxyphenyl)hexane-3'3''-dithiol, m.p. 84°-86°C. with an acetic acid of crystallization.

Analysis: Found: C, 62.04; H, 7.11; S, 15.6;
$C_{20}H_{26}O_2S_2CH_3COOH$ requires: C, 62.5; H, 7.11; S, 15.2 percent c. 1,6-Bis 3(1,2-transdicarboxy-vinylthia)-4-methoxyphenyl hexane A solution of 2.3 parts potassium hydroxide in 50 parts of water was added dropwise to a slurry of 5 parts 1,6-bis(4-methoxyphenyl)hexane-3'3''-dithiol and 4.89 parts of acetylene-dicarboxylic acid monopotassium salt. It was stirred and heated on a steam bath for 30 minutes, filtered hot and acidified. The precipitated solid was filtered off, boiled with chloroform and the residue was dried, to give 1,6-bis 3(1,2-transdicarboxyvinylthia)-4-methoxyphenyl hexane, m.p. 168°-170° decomp.

Analysis: Found: C, 55.0; H, 5.26; S, 10.0
$C_{28}H_{30}S_2O_{10}H_2O$ requires: C, 55.2; H, 5.26; S, 10.5 d. 1,6-Bis(2-carboxy-8-methoxy-1-thiachromon-5-yl)hexane

To 10 parts of concentrated sulphuric acid was added 2 parts of 1,6-bis[3(1,2-transdicarboxyvinylthia)-4-methoxyphenyl]hexane and the mixture was allowed to stand for 3 hours at room temperature. It was poured into 100 parts of ice, and the precipitated solid was filtered off, washed and dried in an oven, m.p. 222°-223°C. Purification with dioxan and water gave 1,6-bis(2-carboxy-8-methoxy- 1-thiachromon-5-yl)hexane, m.p. 237°-238°C.

Analysis: Found: C, 60.0; H, 4.80; S, 11.81;
$C_{28}H_{26}S_2O_8$ requires: C, 60.5; H, 4.7; S, 11.55;

e. Disodium salt of 1,6-bis(2-carboxy-8-methoxy-1-thiachromon-5-yl)hexane.

0.56 Parts of 1,6-bis(2-carboxy-8-methoxy-1-thiachromon-5-yl)hexane were dissolved in a solution of 10 parts water containing 0.16 parts of sodium hydrogencarbonate and freeze dried to give the disodium salt of 1,6-bis(2-carboxy-8-methoxy-1-thiachromon-5-yl)hexane.

EXAMPLE A

The compounds set out in Table I were tested to assess their effectiveness in inhibiting antibody-antigen reactions.

In the antibody-antigen tests, the effectiveness of the compounds of the invention in inhibiting the passive cutaneous anaphylaxis in rats was assessed. It has been proved that this form of test gives reliable qualitative indications of the ability of the compounds under test to inhibit antibody-antigen reactions in man.

In this test method Sprague-Dawley rats (male or female) having a body weight of from 100 to 130 gms. were injected subcutaneously with about 2,000 N. Braziliensis larvae per animal. After 4 weeks the rats were reinfected at weekly intervals with four further subcutaneous administrations of from 2,000–12,000 larvae per animal. One week after the last reinfection the rats were bled by heart puncture and 15–20 mls. of blood collected from each animal. The blood samples were centrifuged at 3,500 rpm. for 30 minutes in order to remove the blood plasma from the blood cells. The blood plasma was used to provide a serum containing the worm antibody.

A pilot sensitivity test was carried out to determine the least quantity of serum required to give a skin weal in control animals in the test described below of 2 cm. diameter. It was found that with rats in the body weight range 100–130 gms, satisfactory results were obtained using a serum diluted 1:8 with physiological saline solution. This diluted solution was called antibody serum A.

The antigen to react with the antibody in serum A was prepared by removing worms from the gut of the infected rats, homogenising the worms, centrifuging the homogenate and collecting the supernatent liquor. This liquor was diluted with water to give a protein content of 10 millegrams/ml and was known as serum B.

Sprague-Dawley rats in the body weight range 100 to 130 gms. were sensitized by intradermal injection of 0.1 mls. of serum A into the right flank. Sensitivity was allowed to develop for 24 hours and the rats were then injected intraveneously with 1 ml/100 gms. body weight of a mixture of serum B (0.25 mls), Evans Blue dye solution (0.25 mls.) and the solution of the compound under test (0.5 mls. of varying concentrations). Insoluble compounds were administered as a separate intraperitoneal injection 5 minutes before intraveneous administration of serum B and Evans Blue dye. For each concentration of the compound under test five rats were injected. Five rats were used as controls in each test. The dosages of the compound under test were selected so as to give a range of inhibition values.

Thirty minutes after injection of serum B the rats were killed and the skins removed and reversed. The intensity of the anaphylactic reaction was assessed by comparing the size of the characteristic blue weal produced by spread of the Evans Blue dye from the sensitization site, with the size of the weal in the control animals. The size of the weal was rated as 0 (no weal detected, i.e. 100 percent inhibition) to 4 (no difference in size of weal, i.e. no inhibition) and the percentage inhibition for each dose level calculated as:

$$\text{Percent inhibition} = \frac{(\text{Control group score} - \text{treated group score}) \times 100}{\text{Control group score}}$$

The percentage inhibitions for the various dose levels were plotted graphically for each compound. From these graphs the dosage required to achieve a 50 percent inhibition of the anaphylactic reaction ($ID_{50}$) may be determined. These results are tabulated in Table I.

TABLE I

| Compound of Example No. (as disodium salt) | $ID_{50}$ value in mg/kg of sodium salt |
|---|---|
| 3 | 4.4 |
| 4 | 2.2 |

We claim
1. A compound of the formula

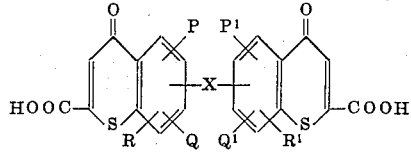

in which P, Q, R, P¹, Q¹ and R¹ are each selected from hydrogen, hydroxy, halogen, lower alkyl or lower alkoxy, or lower alkyl or lower alkoxy substituted by hydroxy, lower alkoxy or di-lower-alkyl-amino, and X is a group —X¹— or —OX¹O in which X¹ is a polymethylene chain of up to and including six carbon atoms, optionally substituted by a single hydroxy group.

2. A compound of the formula

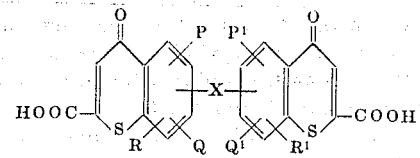

in which P, Q, R, P¹, Q¹ and R¹ are each selected from hydrogen, hydroxy, halogen, lower alkyl or lower alkoxy, or lower alkyl or lower alkoxy substituted by hydroxy, lower alkoxy or di-lower-alkylamino, and X is a polymethylene chain of up to and including 6 carbon atoms, optionally substituted by a single hydroxy group.

3. A compound as claimed in claim 1, wherein the chromone groups are linked through the same positions on the chromone nuclei.

4. A compound as claimed in claim 1, wherein the chromone groups are linked through the 6, 6¹ or the 7, 7¹ positions.

5. A compound as claimed in claim 1 in the form of a pharmaceutically acceptable derivative thereof.

6. A compound as claimed in claim 1 in the form of the di-sodium salt thereof.

7. A compound as claimed in claim 1, which is 1,5-Bis(2-carboxy-1-thiachromon-6-yloxy) pentane.

8. A compound as claimed in claim 2, which is 1,5-Bis(2-carboxy-1-thiachromon-6-yl)pentane.

9. A compound as claimed in claim 1, which is 1,3-Bis(2-carboxy-1-thiachromon-6-yloxy)propan-2-ol.

10. A compound as claimed in claim 2, which is 1,6-Bis(2-carboxy-8-methoxy-1-thiachromon-5-yl)hexane.

11. A compound as claimed in claim 2 wherein the chromone groups are linked through the same positions on the chromone nuclei.

12. A compound as claimed in claim 11 wherein the chromone groups are linked through the 6, 6¹ or 7, 7¹ positions.

* * * * *